United States Patent
Lee et al.

(10) Patent No.: US 12,540,074 B2
(45) Date of Patent: *Feb. 3, 2026

(54) DEHYDROGENATION REACTION APPARATUS

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Jaeyong Lee, Seongnam-si (KR); Jin Woo Choung, Suwon-si (KR); Yongwoo Kim, Gunpo-si (KR); Jihui Seo, Ulsan (KR); Pyung Soon Kim, Suwon-si (KR); Yoondo Kim, Seoul (KR); Jaewon Kirk, Seoul (KR); Suk Woo Nam, Seoul (KR); Hyuntae Sohn, Seoul (KR); Yongmin Kim, Seoul (KR); Hyangsoo Jeong, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

(*) Notice: Subject to any disclaimer, the term of this patent is extended or adjusted under 35 U.S.C. 154(b) by 715 days.

This patent is subject to a terminal disclaimer.

(21) Appl. No.: 17/971,094

(22) Filed: Oct. 21, 2022

(65) Prior Publication Data
US 2024/0059558 A1 Feb. 22, 2024

(30) Foreign Application Priority Data
Aug. 17, 2022 (KR) .................. 10-2022-0102927

(51) Int. Cl.
*C01B 3/06* (2006.01)
*B01J 8/02* (2006.01)

(52) U.S. Cl.
CPC ............. *C01B 3/065* (2013.01); *B01J 8/0285* (2013.01); *C01B 2203/085* (2013.01); *C01B 2203/1614* (2013.01)

(58) Field of Classification Search
CPC ....... B01J 8/00; B01J 8/001; B01J 8/02; B01J 8/0285; B01J 19/00; B01J 19/0006;
(Continued)

(56) References Cited

U.S. PATENT DOCUMENTS

2025/0236517 A1* 7/2025 Lee .................. B01J 8/008

FOREIGN PATENT DOCUMENTS

KR 20180010604 A 1/2018
KR 20210133692 A * 11/2021 ............. C01B 3/065

OTHER PUBLICATIONS

Machine translation of KR 20210133692 A (Year: 2021).*

* cited by examiner

*Primary Examiner* — Natasha E Young
(74) *Attorney, Agent, or Firm* — Lempia Summerfield Katz LLC

(57) ABSTRACT

A dehydrogenation reaction apparatus includes: an aqueous add solution tank that stores an aqueous acid solution; a dehydrogenation reactor that stores a chemical hydride and selectively receives the aqueous acid solution stored in the aqueous add solution tank; and a heat control device. The heat control device is disposed inside or outside the dehydrogenation reactor and controls an internal temperature of the dehydrogenation reactor.

10 Claims, 5 Drawing Sheets

(58) Field of Classification Search
CPC .............. B01J 19/0013; B01J 2208/00; B01J 2208/00008; B01J 2208/00017; B01J 2208/00026; B01J 2208/00035; B01J 2208/0007; B01J 2208/00106; B01J 2208/00115; B01J 2208/00141; B01J 2208/00168; B01J 2208/00176; B01J 2208/00203; B01J 2208/00256; B01J 2208/0053; C01B 3/00; C01B 3/02; C01B 3/06; C01B 3/065; C01B 2203/00; C01B 2203/06; C01B 2203/08; C01B 2203/0805; C01B 2203/085; C01B 2203/16; C01B 2203/1614; H01M 8/00; H01M 8/04; H01M 8/04007; H01M 8/04029; H01M 8/06; H01M 8/0662; H01M 8/0668

See application file for complete search history.

DEHYDROGENATION REACTION APPARATUS

CROSS-REFERENCE TO RELATED APPLICATION

This application claims priority to and the benefit of Korean Patent Application No. 10-2022-0102927, filed in the Korean Intellectual Property Office on Aug. 17, 2022, the entire contents of which are incorporated herein by reference.

BACKGROUND

(a) Field of the Disclosure

The present disclosure relates to a dehydrogenation reaction apparatus that may supply hydrogen to a fuel cell stack.

(b) Description of the Related Art

Due to the depletion of fossil energy and environmental pollution problems, there is a great demand for renewable and alternative energy. Thus, hydrogen is attracting attention as one such alternative energy.

A fuel cell and a hydrogen combustion device use hydrogen as a reaction gas. In order to apply the fuel cell and the hydrogen combustion device to vehicles and various electronic products, a technology for stable and continuous supply of hydrogen is required.

In order to supply hydrogen to a device that uses hydrogen, a method of supplying hydrogen, whenever hydrogen is needed, from a separately installed hydrogen supply source may be used. In this way, compressed hydrogen or liquefied hydrogen may be used.

Conventionally, an aqueous acid solution, an add catalyst, or water and an add catalyst are injected into a hydride stored in a dehydrogenation reactor in order to supply hydrogen to a fuel cell or a hydrogen combustion device, thereby generating hydrogen.

When a large amount of hydrogen is generated, the hydrogen generation reaction, through an aqueous solution, prevents evaporation of a reactant due to an exothermic reaction and at the same time requires an excess of water to dissolve a product. Thus, a problem of increasing a volume and weight of an entire system occurs.

On the other hand, in a case of an acid catalyst method, reaction is possible even with a relatively small amount of water. However, due to exothermic reaction, evaporation of water and the acid catalyst occurs, causing a problem in that the hydrogen conversion rate is reduced.

In addition, when a reaction occurs by adding water and an acid catalyst to a solid hydride, it becomes difficult to uniformly mix the solid hydride and the liquid aqueous acid solution. Thus, it is difficult to control a flow rate of hydrogen. Also, when the generated hydrogen is pressurized by using separate power and is temporarily stored, additional power is consumed and a separate compressor is required.

The above information disclosed in this Background section is only to enhance understanding of the background of the disclosure. Therefore, the Background may contain information that does not form the prior art that is already known in this country to a person of ordinary skill in the art.

SUMMARY

The present disclosure has been made in an effort to provide a dehydrogenation reaction apparatus that may improve a hydrogen conversion rate by preventing evaporation of reactants due to heat generation in a reaction vessel in which a solid hydride is stored. The dehydrogenation reaction apparatus may also temporarily store hydrogen generated during reaction without additional power and supply it to a hydrogen-using device at a uniform flow rate.

An embodiment of the present disclosure provides a dehydrogenation reaction apparatus including: an aqueous acid solution tank that stores an aqueous acid solution; a dehydrogenation reactor that stores a chemical hydride and selectively receives the aqueous acid solution stored in the aqueous acid solution tank; and a heat control device. The heat control device is disposed inside or outside the dehydrogenation reactor and controls an internal temperature of the dehydrogenation reactor.

The heat control device may be provided inside or outside the dehydrogenation reactor and may include a pipe through which a heat medium flows.

The pipe may be formed in a coil shape along the inside or outside of the dehydrogenation reactor.

When the pipe is provided outside the dehydrogenation reactor, the pipe of the coil shape may be installed to contact an external circumferential surface of a reaction vessel of the dehydrogenation reactor.

The heat medium flowing along the pipe may include at least one of an aqueous liquid refrigerant, an oil-based liquid refrigerant, a fluorine-based gas refrigerant, and an inorganic compound-based gas refrigerant.

The dehydrogenation reaction apparatus may further include a heat exchanger cooling the heat medium flowing along the pipe.

The dehydrogenation reaction apparatus may further include a buffer tank that temporarily stores the hydrogen generated in the dehydrogenation reactor.

The dehydrogenation reaction apparatus may further include a back pressure regulator provided between the dehydrogenation reactor and the buffer tank.

The dehydrogenation reaction apparatus may further include a pressure regulator provided downstream of the buffer tank.

The dehydrogenation reaction apparatus may further include a methanator provided between the dehydrogenation reactor and the buffer tank to remove carbon monoxide generated inside the dehydrogenation reactor.

According to the dehydrogenation reaction apparatus of the embodiment of the present disclosure as described herein, by configuring an apparatus for controlling heat and pressure in a dehydrogenation reactor in which a solid hydride is stored and reacted, it is possible to prevent evaporation of a reactant due to heat generation to improve a hydrogen conversion rate.

In addition, it is possible to temporarily store hydrogen generated during reaction without using separate power to supply hydrogen to a hydrogen-using device at a uniform flow rate.

BRIEF DESCRIPTION OF THE DRAWINGS

The drawings are for reference only in describing embodiments of the present disclosure. Therefore, the technical idea of the present disclosure should not be limited to the accompanying drawings.

DETAILED DESCRIPTION OF THE EMBODIMENTS

Figure 1:
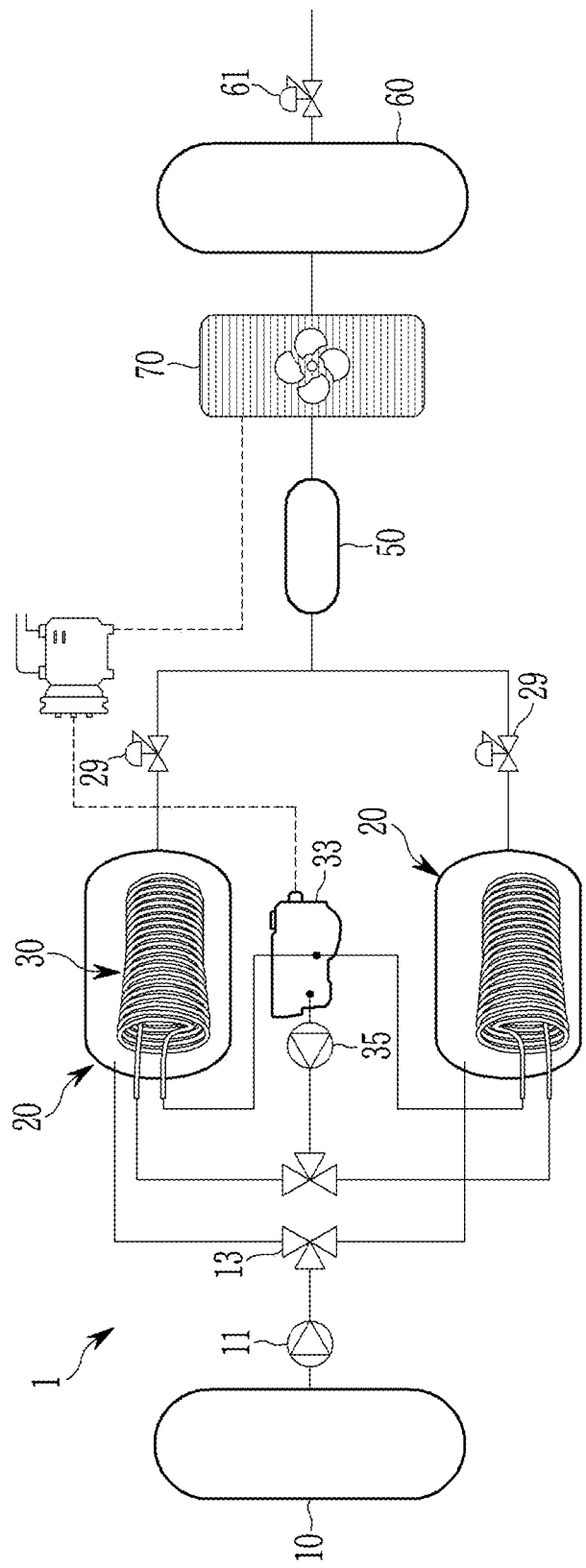
FIG. 1 illustrates a schematic diagram of a configuration of a dehydrogenation reaction apparatus according to an embodiment of the present disclosure.

The present disclosure is described more fully hereinafter with reference to the accompanying drawings, in which embodiments of the disclosure are shown. However, as those having ordinary skill in the art should realize, the described embodiments may be modified in various different ways, all without departing from the spirit or scope of the present inventive concept.

In order to clearly describe the present disclosure, parts or portions that are irrelevant to the description have been omitted, and identical or similar constituent elements throughout the specification are denoted by the same reference numerals.

In addition, since the size and thickness of each configuration shown in the drawings are arbitrarily shown for convenience of the description, the present disclosure is not necessarily limited to the configurations illustrated in the drawings. In order to clearly illustrate several parts and areas, enlarged thicknesses are shown. When a component, device, element, or the like of the present disclosure is described as having a purpose or performing an operation, function, or the like, the component, device, or element should be considered herein as being "configured to" meet that purpose or to perform that operation or function.

Hereinafter, a dehydrogenation reaction apparatus according to an embodiment of the present disclosure is described in detail with reference to the accompanying drawings.

Figure 2:
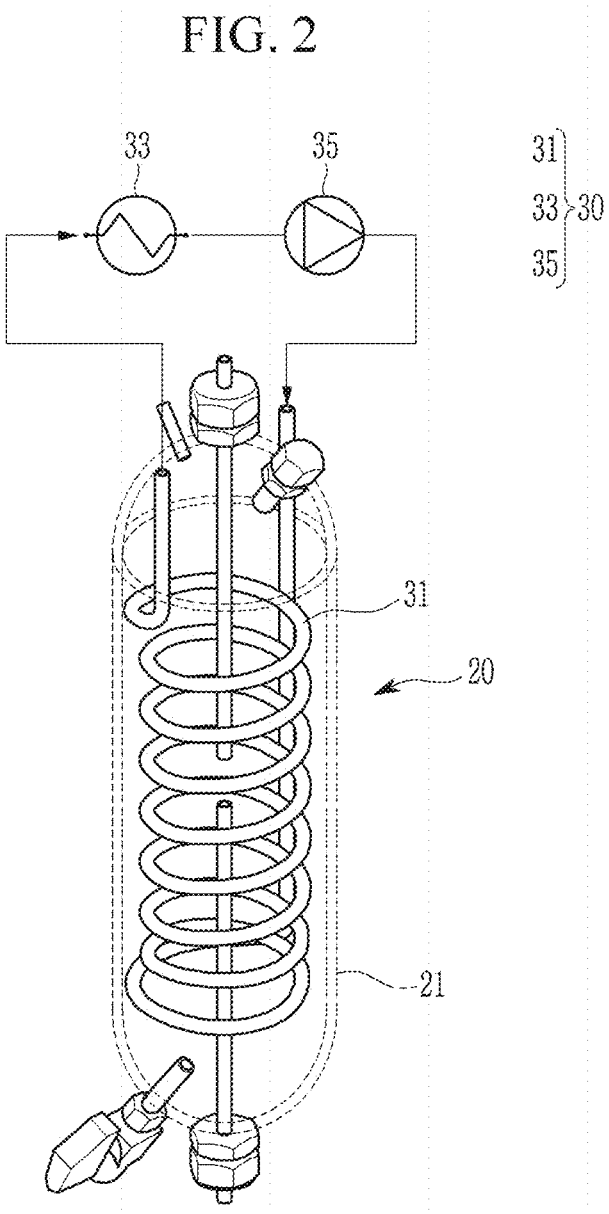
FIG. 2 illustrates a schematic diagram of a configuration of a dehydrogenation reactor according to an embodiment of the present disclosure.
Figure 3:
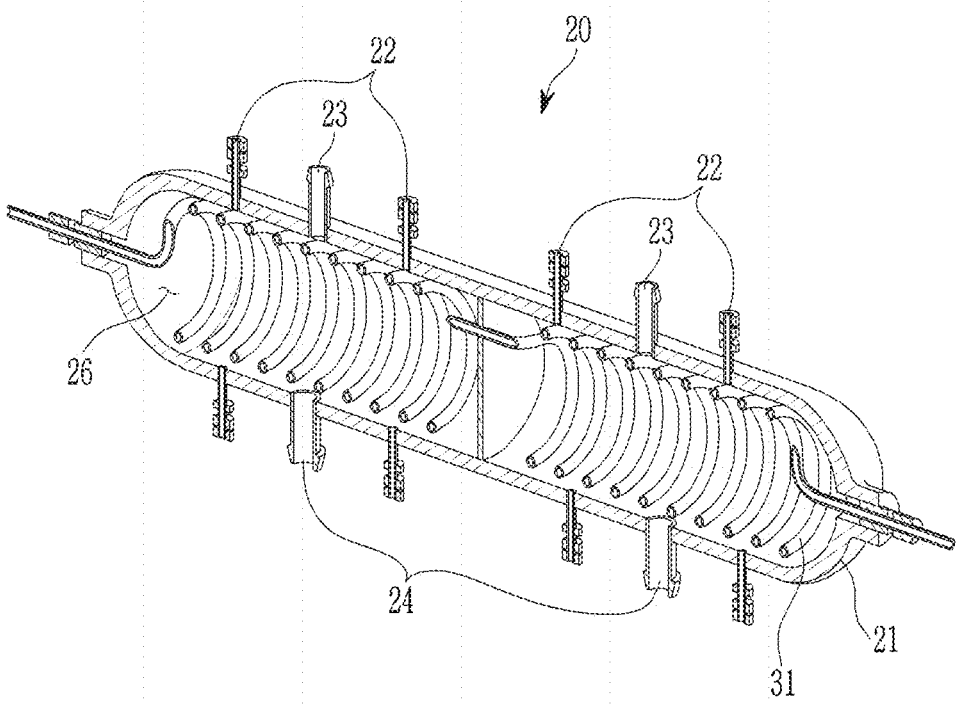
FIG. 3 illustrates a cross-sectional perspective view of a configuration of a dehydrogenation reactor according to an embodiment of the present disclosure.

FIG. 1 illustrates a schematic diagram of a configuration of a dehydrogenation reaction apparatus according to an embodiment of the present disclosure. FIG. 2 illustrates a schematic diagram of a configuration of a dehydrogenation reactor according to an embodiment of the present disclosure. FIG. 3 illustrates a cross-sectional perspective view of a configuration of a dehydrogenation reactor according to an embodiment of the present disclosure.

As shown in FIG. 1, a dehydrogenation reaction apparatus 1 according to an embodiment of the present disclosure may include a dehydrogenation reactor 20 that generates hydrogen by reaction of a chemical hydride with an aqueous acid solution. The apparatus 1 also may include an aqueous acid solution tank 10 that stores an aqueous acid solution supplied to the dehydrogenation reactor 20 and a buffer tank 60 that temporarily stores the hydrogen generated in the dehydrogenation reactor 20.

The dehydrogenation reactor 20 may be configured as a high-temperature and high-pressure vessel so that the dehydrogenation reaction may be performed under high-temperature and high-pressure conditions. For example, the dehydrogenation reactor 20 may have a cylindrical, spherical, rectangular parallelepiped, or polygonal prism shape. In one embodiment, hydrogen reactor 20 may have a cylindrical shape.

Referring to FIGS. 2-5, the dehydrogenation reactor 20 may include a reaction vessel 21 in which an empty reaction chamber 26 is formed and hay include a heat control device 30 provided inside or outside the reaction vessel 21.

The reaction chamber 26 formed inside the reaction vessel 21 is filled with a chemical hydride. The chemical hydride is in a solid state, and for example, may be in one of a powder, granular, bead, microcapsule, pellet, or other suitable form.

The chemical hydride may be a compound that is hydrolyzed to produce hydrogen and a hydrolyzate. For example, the chemical hydride may include sodium borohydride ($NaBH_4$), lithium borohydride ($LiBH_4$), potassium borohydride ($KBH_4$), ammonium borohydride ($NH_4BH_4$), ammonia borane ($NH_3BH_3$), tetramethyl ammonium borohydride (($CH_3)_4NH_4BH_4$), sodium aluminum hydride ($NaAlH_4$), lithium aluminum hydride ($LiAlH_4$), potassium aluminum hydride ($KAlH_4$), calcium diborohydride ($Ca(BH_4)_2$), magnesium diborohydride ($Mg(BH_4)_2$), sodium gallium hydride ($NaGaH_4$), lithium gallium hydride ($LiGaH_4$), potassium gallium hydride ($KGaH_4$), lithium hydride ($LiH$), calcium hydride ($CaH_2$), magnesium hydride ($MgH_2$), or a mixture thereof.

The reaction vessel 21 is formed with an aqueous solution inlet 22 for supplying an aqueous add solution, a gas outlet 23 for discharging hydrogen gas generated in the reaction chamber 26, and a product outlet 24 for discharging a product produced by reaction of a chemical hydride and an aqueous add solution.

The aqueous solution inlet 22 and the aqueous acid solution tank 10 are fluidly connected to supply the aqueous add solution to the reaction chamber 26 through the aqueous solution inlet 22. A detailed description of the aqueous acid solution tank 10 is provided below.

Since the hydrogen generation reaction inside the dehydrogenation reactor 20 is an exothermic reaction, the heat control device 30 is provided in the reaction vessel 21 to cool the reaction heat. The heat control device 30 may be disposed inside or outside the reaction vessel 21 and controls an internal temperature of the dehydrogenation reactor 20.

To this end, the heat control device 30 includes a pipe 31 through which a heat medium of the dehydrogenation reactor 20 flows (or circulates). The heat medium flows (or circulates) inside the pipe 31.

The pipe 31 may be formed in a spiral coil shape along the inside or outside of the dehydrogenation reactor 20. By forming the pipe 31 in the spiral coil shape, a heat exchange area with the inside or outside of the reaction vessel 21 of the dehydrogenation reactor 20 may be maximized.

The pipe 31 is made of a metal-based material such as copper or steel, and a surface of the pipe 31 may be coated with Teflon to prevent corrosion due to an add or base.

As shown in FIGS. 2 and 3, when the pipe 31 is provided inside the dehydrogenation reactor 20, the pipe 31, which is formed in a coil shape, may be smaller than a diameter of an interior circumferential surface of the reaction vessel 21. For example, a diameter of the pipe 31 of the coil shape may be greater than 30% and smaller than 100% of the diameter of the interior circumferential surface of the reaction vessel 21.

Figure 4:
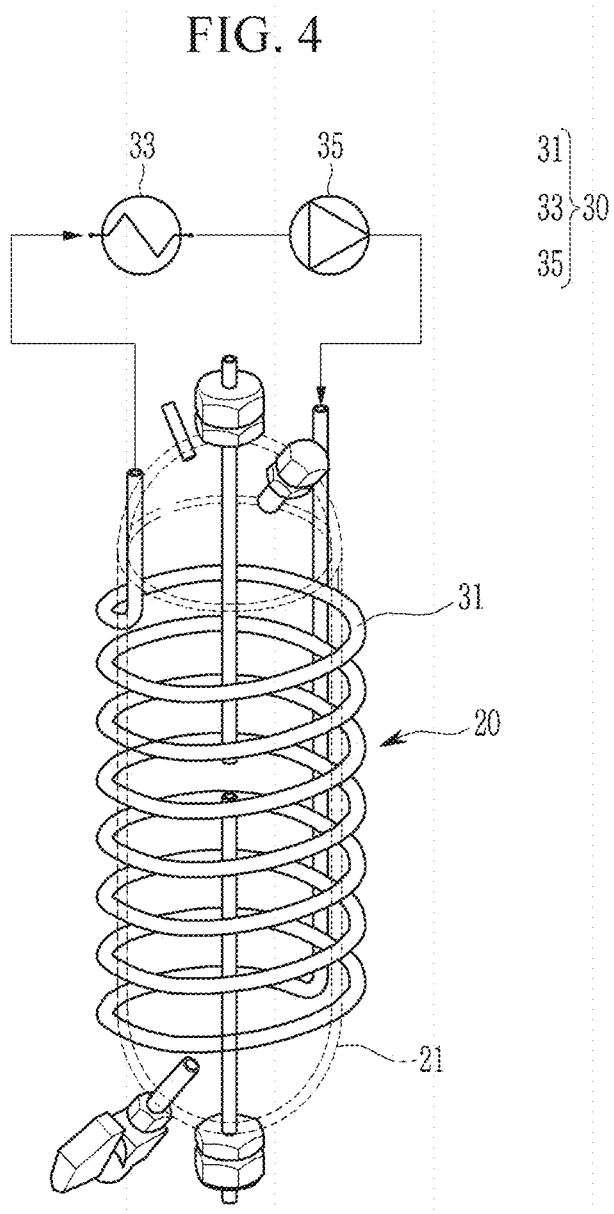
FIG. 4 illustrates a schematic diagram of a configuration of a dehydrogenation reactor according to another embodiment of the present disclosure.
Figure 5:
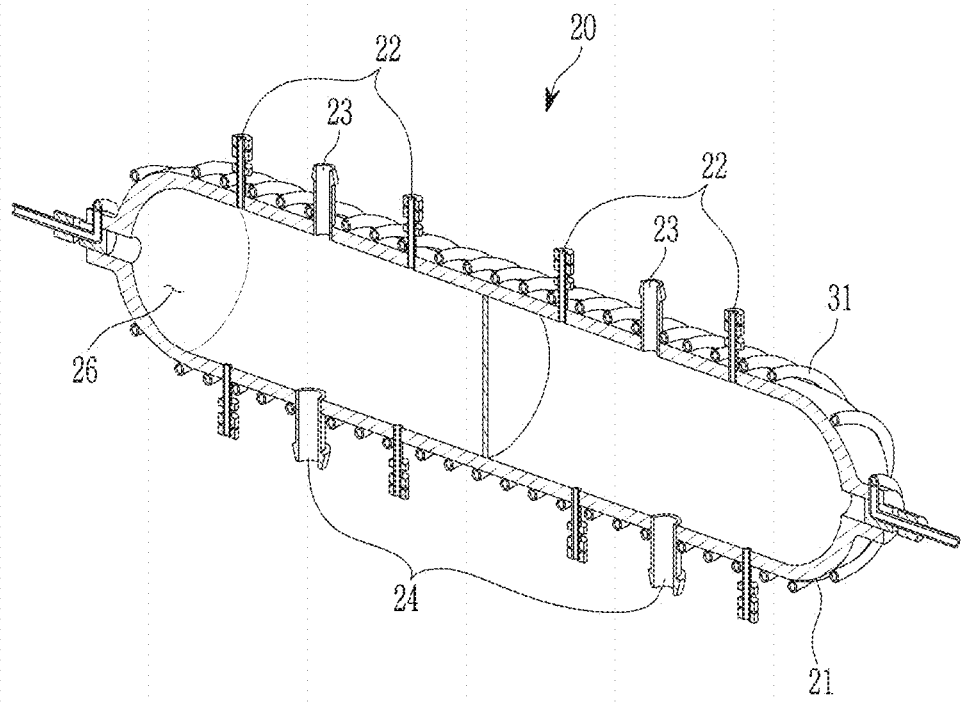
FIG. 5 illustrates a cross-sectional perspective view of a configuration of a dehydrogenation reactor according to another embodiment of the present disclosure.

As shown in FIGS. 4 5, when the pipe 31 is provided outside the dehydrogenation reactor 20, the pipe 31 of the coil shape is formed to be larger than a diameter of an exterior circumferential surface of the reaction vessel 21. In this case, the pipe 31 of the coil shape is installed to contact the exterior circumferential surface of the reaction vessel 21. Since the pipe 31 is provided to contact the exterior circumferential surface of the reaction vessel 21 of the dehydrogenation reactor 20, the heat generated inside the reaction vessel 21 may be quickly transmitted or transferred to the pipe 31 by heat conduction.

The heat medium flowing along the inside of the pipe 31 may include at least one of an aqueous liquid refrigerant, an oil-based liquid refrigerant, a fluorine-based gas refrigerant, or an inorganic compound-based gas refrigerant.

A heat exchanger 33 for cooling the heat medium flowing along the pipe 31 may be provided. The heat exchanger 33 may be an air-cooled or water-cooled radiator, or a plate heat exchanger 33. As necessary, the heat exchanger 33 may be used in common with an air conditioner compressor provided in a vehicle.

In addition, a second pump 35 may be provided between the heat exchanger 33 and the reaction vessel 21 to circulate the heat medium through the pipe 31.

Referring back to FIG. 1, a first pump 11 is provided between the aqueous acid solution tank 10 and the dehydrogenation reactor 20. The aqueous acid solution, which is stored in the aqueous acid solution tank 10, is pumped by the first pump 11 and supplied to the dehydrogenation reactor 20.

The aqueous acid solution tank 10 may be formed with a corrosion-resistant protective film such as a Teflon coating in order to prevent corrosion by the aqueous acid solution. The aqueous acid solution adjusts a pH of the chemical hydride to shorten a half-life thereof, thereby promoting the dehydrogenation reaction.

The acid may be an inorganic acid such as a sulfuric acid, a nitric acid, a phosphoric acid, a boric acid, or a hydrochloric acid. The acid may be an organic acid such as a heteropolyacid, an acetic acid, a formic acid, a malic acid, a citric acid, a tartaric acid, an ascorbic acid, a lactic acid, an oxalic acid, a succinic acid, or a tauric acid, or a mixture thereof. Since the acid has a smaller molecular weight than a hydrogen ion, it may reduce a system weight. Further, since the acid is safer than a hydrochloric acid in a high concentration state, formic acid (HCOOH) may be used.

The formic acid, as a weak acid, may be relatively safely used by being maintained at a low pH under the conditions described in the present disclosure. In addition, since the captured carbon dioxide may be obtained through hydrogenation, the captured carbon dioxide is an important material in terms of re-utilizing/recycling of carbon dioxide. In addition, formate is converted to bicarbonate through a dehydrogenation reaction, in which case hydrogen may be additionally obtained.

As necessary, a check valve 13 may be provided between the first pump 11 and the dehydrogenation reactor 20. The check valve 13 makes it possible to prevent the aqueous acid solution from flowing back into the aqueous acid solution tank 10 from the dehydrogenation reactor 20.

The buffer tank 60 temporarily stores the hydrogen generated in the dehydrogenation reaction apparatus 1, and as necessary, the hydrogen stored in the buffer tank 60 is supplied to a fuel cell. To this end, the buffer tank 60 and the dehydrogenation reactor 20 are fluidly connected.

A back pressure regulator 29 is provided between the buffer tank 60 and the dehydrogenation reactor 20 (or downstream of the dehydrogenation reactor 20), In addition, a pressure regulator 61 or a valve is provided downstream of the buffer tank 60.

In order to stably extract hydrogen from the dehydrogenation reactor 20, it is necessary to minimize a phase change of the reactant by increasing an internal pressure of the reaction vessel 21 to a specific pressure (for example, 1 to 350 bar) to adjust a boiling point (100° C. to 400° C.) of the reactant. To this end, by disposing of the back pressure regulator 29 downstream of the dehydrogenation reactor 20, it is possible to adjust the internal pressure of the reaction vessel 21.

In this case, until the pressure regulator 61 or the valve is opened to extract hydrogen from the buffer tank 60, the hydrogen generated inside the reaction vessel 21 of the dehydrogenation reactor 20, by the back pressure regulator 29, may be temporarily stored in the buffer tank 60 at substantially the same pressure as the internal pressure of the reaction vessel 21 of the dehydrogenation reactor 20. Therefore, it is possible to store hydrogen in the buffer tank 60 at a pressure similar to the internal pressure of the dehydrogenation reactor 20 without the need to apply additional energy.

On the other hand, a methanator 50 that removes carbon monoxide generated inside the dehydrogenation reactor 20 may be provided between the dehydrogenation reactor 20 and the buffer tank 60 (or downstream of the dehydrogenation reactor 20).

The methanator 50 converts carbon monoxide generated as a by-product into methane when hydrogen is generated by dehydrogenation reaction between the hydride and the aqueous acid solution inside the dehydrogenation reactor 20.

In the methanator 50, while gas of hydrogen and carbon monoxide discharged from the dehydrogenation reactor 20 passes through a catalyst, the carbon monoxide is converted into methane. The catalyst of the methanator 50 may include at least one of nickel (Ni), ruthenium (Ru), cobalt (Co), rhodium (Rh), and iron (Fe). The catalyst is in a solid state, and for example, may be in one of a granular, bead, microcapsule, or pellet form.

As necessary, a gas-liquid separator 70 may be provided between the methanator 50 and the buffer tank 60. Excess water contained in hydrogen gas may be separated through the gas-liquid separator 70.

Hereinafter, an operation of the dehydrogenation reaction apparatus 1 according to the embodiment of the present disclosure as described above is described in detail with reference to the accompanying drawing.

As described above, the reaction chamber 26 of the reaction vessel 21 of the dehydrogenation reactor 20 is charged with a chemical hydride. In this case, the chemical hydride is charged in a solid powder, granular, bead, microcapsule, or pellet form.

When the internal pressure of the buffer tank 60 is lowered to a set pressure or less by the control of the pressure regulator 61 or the valve, an aqueous acid solution is injected into the inside of the reaction chamber 26 of the reaction vessel 21 of the dehydrogenation reactor 20 through the aqueous solution inlet 22. In this case, the aqueous acid solution mixed at a specific molar ratio is injected by using the first pump 11. In this case, an injection rate of the aqueous acid solution may vary depending on a size of the dehydrogenation reactor 20 and an amount of chemical hydride.

Hydrogen is generated by the dehydrogenation reaction between the chemical hydride charged into the reaction vessel 21 by the injection of the aqueous acid solution. In this case, in the inner space of the reaction vessel 21, a dehydrogenation reaction in which hydrogen is generated by a hydrolysis reaction of a chemical hydride by an aqueous acid solution proceeds. For example, the chemical hydride may be $NaBH_4$, and the acid may be formic acid (HCOOH). In a case of a system using $NaBH_4$ and HCOOH, a temperature of the dehydrogenation reaction may be 10° C. to 400° C. and 100° C. to 250° C. In this case, for stable hydrogen extraction in the dehydrogenation reactor 20, the internal pressure of the reaction vessel 21 is raised to a specific pressure through the back pressure regulator 29 disposed downstream of the dehydrogenation reactor 20.

On the other hand, when the dehydrogenation reaction is performed in the reaction vessel 21, carbon monoxide, which is a by-product, may be generated.

Hydrogen, generated by the dehydrogenation reaction in the reaction chamber 26 of the reaction vessel 21, and carbon monoxide, as a by-product, are discharged to the methanator 50 through the gas outlet 23. Carbon monoxide is converted into methane by the catalyst provided inside the methanator 50. Hydrogen and methane are supplied to the buffer tank 60 and temporarily stored. In this case, until the pressure regulator 61 or the valve disposed downstream of the buffer tank 60 is opened, the hydrogen generated inside the reaction vessel 21 of the dehydrogenation reactor 20 is stored in the buffer tank 60 at substantially the same pressure as the internal pressure of the reaction vessel 21.

When it is necessary to supply hydrogen to a fuel cell or a hydrogen combustion device, the pressure regulator 61, which is disposed downstream of the buffer tank 60, is adjusted to supply hydrogen from the buffer tank 60 to the fuel cell or hydrogen combustion device.

According to the dehydrogenation reaction apparatus 1 of the embodiments of the present disclosure as described above, the boiling point of the reactants inside the reaction vessel 21 may be controlled by adjusting the internal pressure of the reaction vessel 21 of the dehydrogenation reactor 20 through the back pressure regulator 29. Through this, it is possible to prevent vaporization of the reactants due to the exothermic reaction to induce smooth mixing between the reactants.

In addition, the hydrogen conversion rate in the dehydrogenation reactor 20 may be improved by controlling the internal temperature of the reaction vessel 21 of the dehydrogenation reactor 20 through the heat control device 30 to be an optimal reaction temperature.

In addition, hydrogen may be stored in the buffer tank 60 at substantially the same pressure as the internal pressure of the reaction vessel 21 of the dehydrogenation reactor 20 through the back pressure regulator 29 and the pressure regulator 61 without consuming additional energy.

Furthermore, the flow rate of hydrogen supplied to the fuel cell or the hydrogen combustion device may be adjusted through the pressure regulator 61 downstream of the buffer tank 60. Thus, the flow rate of hydrogen may be stably controlled.

While the inventive concepts of this disclosure have been described in connection with what are presently considered to be practical embodiments, it is to be understood that the disclosure is not limited to the disclosed embodiments. On the contrary, the disclosure is intended to cover various modifications and equivalent arrangements included within the spirit and scope of the appended claims.

DESCRIPTION OF SYMBOLS

1: dehydrogenation reaction apparatus
10: aqueous acid solution tank
11: first pump
13: check valve
20: dehydrogenation reactor
21: reaction vessel
22: aqueous solution inlet
23: gas outlet
24: product outlet
26: reaction chamber
29: back pressure regulator
30: heat control device
31: pipe
33: heat exchanger
35: second pump
50: methanator
60: buffer tank
61: pressure regulator

What is claimed is:

1. A dehydrogenation reaction apparatus, comprising:
an aqueous acid solution tank that stores an aqueous acid solution;
a dehydrogenation reactor that stores a chemical hydride and selectively receives the aqueous acid solution stored in the aqueous acid solution tank; and
a heat control device that is disposed inside or outside the dehydrogenation reactor and controls an internal temperature of the dehydrogenation reactor.

2. The dehydrogenation reaction apparatus of claim 1, wherein the heat control device includes a pipe that is provided inside or outside the dehydrogenation reactor and through which a heat medium flows.

3. The dehydrogenation reaction apparatus of claim 2, wherein the pipe formed in a coil shape along the inside or outside of the dehydrogenation reactor.

4. The dehydrogenation reaction apparatus of claim 3, wherein when the pipe is provided outside the dehydrogenation reactor, the pipe of the coil shape is installed to contact an external circumferential surface of a reaction vessel of the dehydrogenation reactor.

5. The dehydrogenation reaction apparatus of claim 2, wherein the heat medium flowing along the pipe includes at least one of an aqueous liquid refrigerant, an oil-based liquid refrigerant, a fluorine-based gas refrigerant, and an inorganic compound-based gas refrigerant.

6. The dehydrogenation reaction apparatus of claim 2, further comprising a heat exchanger cooling the heat medium flowing along the pipe.

7. The dehydrogenation reaction apparatus of claim 1, further comprising a buffer tank that temporarily stores hydrogen generated in the dehydrogenation reactor.

8. The dehydrogenation reaction apparatus of claim 7, further comprising a back pressure regulator provided between the dehydrogenation reactor and the buffer tank.

9. The dehydrogenation reaction apparatus of claim 7, further comprising a pressure regulator provided downstream of the buffer tank.

10. The dehydrogenation reaction apparatus of claim 6, further comprising a methanator provided between the dehydrogenation reactor and a buffer tank to remove carbon monoxide generated inside the dehydrogenation reactor.

* * * * *